United States Patent
Dou et al.

(10) Patent No.: US 12,103,281 B2
(45) Date of Patent: Oct. 1, 2024

(54) BIAXIALLY ORIENTED COMPOSTABLE COMPOSITE FILM

(71) Applicant: TORAY PLASTICS (AMERICA), INC., North Kingstown, RI (US)

(72) Inventors: Shichen Dou, North Kingstown, RI (US); Joshua R. Cloutier, North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 0 days.

(21) Appl. No.: 18/090,732

(22) Filed: Dec. 29, 2022

(65) Prior Publication Data

US 2024/0066847 A1 Feb. 29, 2024

Related U.S. Application Data (60) Provisional application No. 63/402,574, filed on Aug. 31, 2022.

(51) Int. Cl.
 *B32B 27/36* (2006.01)
 *B32B 7/02* (2019.01)
 (Continued)

(52) U.S. Cl.
 CPC ............... *B32B 27/36* (2013.01); *B32B 7/02* (2013.01); *B32B 7/027* (2019.01); *B32B 27/08* (2013.01); *B32B 27/18* (2013.01); *B32B 27/20* (2013.01); *B32B 2250/03* (2013.01); *B32B 2250/244* (2013.01); *B32B 2264/0214* (2013.01);
 (Continued)

(58) Field of Classification Search
 CPC ................ B32B 27/36; C08L 67/00–67/08
 See application file for complete search history.

(56) References Cited

U.S. PATENT DOCUMENTS

| | | | |
|---|---|---|---|
| 2010/0323196 A1* | 12/2010 | Dou | B32B 27/08 264/173.16 |
| 2011/0244185 A1* | 10/2011 | Dou | B32B 27/302 428/458 |
| 2018/0281359 A1* | 10/2018 | Neuman | B32B 27/306 |

OTHER PUBLICATIONS

Tabasi et al. "Development of high performance sealable films based on biodegradable/composite blends". Industrial Crops and Products, 72, (2015); pp. 206-213.*

(Continued)

*Primary Examiner* — Prashant J Khatri
(74) *Attorney, Agent, or Firm* — Raj S. Dave; Dave Law Group LLC (57) ABSTRACT

Multi-layer biaxially oriented compostable composite film with a sealant layer formulation has improved heat seal initiation temperature, enhanced plateau seal strength, and broadened heat seal temperature range, while optical clarity is maintained, and film modulus (noise) is reduced. The film includes a core layer comprising a PLA-rich biodegradable composite resin, and a heat sealable layer comprising 20 to 60 wt % amorphous polylactic acid resin, and 40 to 80 wt % flexible compostable polymeric modifier Y having a glass transition temperature of Tg≤0° C. and a melting temperature of 56° C.≤Tm≤90° C. Specifically, the flexible compostable polymeric modifier includes 20 to 70 wt % polybutylene succinate-co-adipate (PBSA) copolymer and 5 to 35 wt % polycaprolactone as a promoter of low heat seal initiation temperature (SIT) and hermeticity. The inventive compostable composite film is desirable to have improved home compostability.

19 Claims, 1 Drawing Sheet

(51) Int. Cl.
*B32B 7/027* (2019.01)
*B32B 27/08* (2006.01)
*B32B 27/18* (2006.01)
*B32B 27/20* (2006.01)

(52) U.S. Cl.
CPC . *B32B 2264/102* (2013.01); *B32B 2264/1022* (2020.08); *B32B 2264/104* (2013.01); *B32B 2264/303* (2020.08); *B32B 2270/00* (2013.01); *B32B 2307/308* (2013.01); *B32B 2307/31* (2013.01); *B32B 2307/406* (2013.01); *B32B 2307/414* (2013.01); *B32B 2307/516* (2013.01); *B32B 2307/518* (2013.01); *B32B 2307/54* (2013.01); *B32B 2307/5825* (2013.01); *B32B 2307/702* (2013.01); *B32B 2307/704* (2013.01); *B32B 2307/7163* (2013.01); *B32B 2307/7244* (2013.01); *B32B 2307/732* (2013.01); *B32B 2307/746* (2013.01); *B32B 2307/75* (2013.01); *B32B 2439/70* (2013.01)

(56) References Cited

OTHER PUBLICATIONS

Diaz et al. "Film Performance of Poly(lactic acid) Blends for Packaging Applications". Journal of Applied Packaging Research, vol. 8, No. 3, Article 4, (2016); pp. 43-51.*

* cited by examiner

BIAXIALLY ORIENTED COMPOSTABLE COMPOSITE FILM

RELATED APPLICATION

This application claims priority from U.S. provisional application No. 63/402,574, titled as "BIAXIALLY ORIENTED BIODEGRADABLE COMPOSITE FILM" filed on Aug. 31, 2022, which is incorporated herein by reference in its entirety.

FIELD OF THE INVENTION

This invention relates to a multi-layer biaxially oriented compostable composite film with a formulation to improve the heat seal initiation and hermeticity while maintaining good optical clarity and improving flexibility. This invention also provides a method to improve the heat sealing performance of a biaxially oriented composite film using bioplastics modifiers certified by TUV Austria for home composting application, resulted in the improvements of the inventive film in biodegradability and compostability.

BACKGROUND OF INVENTION

Bioplastics or biopolymers are considered either amorphous or semicrystalline. A semi-crystalline biopolymer exhibits organized and tightly packed molecular chains, which can vary in shape and size with amorphous areas existing between the crystalline areas. A semi-crystalline biopolymer has a defined melting temperature point (Tm) for its unique highly organized molecular structure and a glass transition temperature for its amorphous phase located between crystal areas, while an amorphous biopolymer only exhibits a glass transition temperature. In the current invention, semi-crystalline biopolymers are also simplified as "crystalline" biopolymers for the purpose of easy comparison with amorphous biopolymers. The modulus and flexibility of a bioplastics composite film strongly depend on the glass transition temperatures and crystallinity as well as Tm of bioplastics used in formulating the film product.

Biaxially oriented polypropylene (BOPP) films are typically used for packaging, decorative, and label applications and often perform multiple functions. In a laminate, they provide printability, transparent or matte appearance, or slip properties. The films sometimes provide a surface suitable for receiving organic or inorganic coatings for gas and moisture barrier properties. The films sometimes provide a heat sealable layer for bag forming and sealing, or a layer that is suitable for receiving an adhesive either by coating or by laminating. Bioplastic films (BOPP film counterpart) must exhibit about the same features of a BOPP film to meet the requirements a packaging film.

In recent years, interest in "Greener" packaging and "End of Life" has been strongly developing. Packaging materials based on biologically derived polymers are increasing due to concerns with plastic pollution, renewable resources, raw materials, and greenhouse gas generation. Bio-based plastics are believed to help reduce reliance on petroleum, reduce production of greenhouse gases, and eliminate plastic pollution, and can be biodegradable or compostable as well. bio-based plastics such as polylactic acid (PLA) and polyhydroxyalkanoates (PHA) derived from a renewable resource are the most popular and commercially available for packaging film applications. Polybutylene succinate (PBS) or Polybutylene succinate-co-adipate (PBSA) is a partially bio-based biodegradable polymer. Other biodegradable polymers such as poly(ε-caprolactone) (PCL) and polybutylene adipate terephthalate (PBAT) that are petroleum-based biodegradable polymers are largely available at the time of this writing to address the concerns of plastics pollution and "End of Life" of disposable single use packaging.

Biaxially oriented polylactic acid (BOPLA) films are transparent with a high clarity and high gloss as well as high modulus, which are very desirable for printing graphics with high visual appearance and for forming rigid container such as stand pouches of a single materials packaging. One example could be a two-layer coextruded film structure in which a base or core layer including a crystalline PLA and a thinner "skin" layer including amorphous PLA is coextruded upon one side of the core layer and then biaxially oriented into a film. The amorphous PLA layer is often used to provide heat sealability to the film as it is non-crystalline; it has a glass transition temperature of 56 to 60° C. (Tg, transition temperature of solidifying or softening) much lower than the melting temperature of the crystalline PLA resins in the core layer. PLA is the most inexpensive biodegradable polymer obtained from renewable source.

A couple obvious disadvantages of this conventional BOPLA packaging have been noted in the marketplace since it was commercialized. Firstly, BOPLA packaging due to its very high modulus results in extremely loud noise at about 95 decibels, which is harmfully loud and potentially damages ear hearing, compared to the noise level about 79 decibels for a conventional BOPP film packaging. Secondly, BOPLA packaging is only industrial compostable (ASTM D 5338-15, 58° C.), this approach has a drawback due to the constraints in public available facilities for composting.

There is a demand to compost waste food as well as food packaging under lower temperatures or in a shorter period of composting time. Therefore, it is needed to improve the biodegradability and compostability of conventional BOPLA film by modification. A test method called HOME COMPOSTING (AS 5810-2010 or "OK COMPOST HOME—CERTIFICATION, 2019 VERSION") was developed for evaluating the biodegradability and compostability of new bioplastics compostable films, which is based on the test procedures of ASTM D5338-15, except that the composting temperature is set at 25±5° C., the test temperature is kept below 30° C. for the duration of the test. Home composting can be conducted in the backyard which can be available for most of consumers in North America.

It is well known in the art that a BOPLA film has a heat resistance lower (thermal dimensional shrinkage higher) than a BOPP film does due to the difference of crystallinity and melting temperature). An oriented bioplastics composite film has a heat resistance even lower than a BOPLA film does, since a bioplastics composite film is made from a combination of PLA resins or PHA resins as well as other low Tg bioplastics as modifiers in that have the characteristics of lower glass transition temperatures (Tg), melting temperatures (Tm), and total crystallinity (Xc). The thermal stability of the physical dimension of a biodegradable composite film under thermal condition relies on the glass temperatures Tg, melting temperatures Tm, and crystallinity (Xc) of the composite film. It is noted that a compostable composite film may not perform as well on a lamination and packaging machine (designed for BOPP film) as BOPP or BOPLA films do due to its lower heat resistance. Therefore, lowering process temperatures, especially heat sealing temperature, is needed to overcome poor performance such as film blocking and wrinkling (due to high thermal shrinkage) as well as heat distortion (due to poor heat resistance) around the heat-sealed areas, namely the end seals of the bag and the back seal of the bag. All those defects in quality are unacceptable to food packaging companies.

Solutions to overcome the issues of poor heat resistance due to heat shrinkage and distortion with biodegradable compostable composite film involve reducing the heat sealing bar temperature setpoint or lowering the bag-making speed of the packaging machine. However, it has been found that temperature control and consistency of the heat sealing bars are highly variable and insufficient to reliably control the distortion problems, especially across a large fleet of packaging machines that may include different models and designs; and lowering the bag-making speed is generally unacceptable due to unit cost issues of the bagged product. One solution could be to improve the thermal stability of bioplastics composite films, however, which is limited by the basic thermal properties of selected bioplastics; another solution could be to improve the heat seal temperature range of bioplastics composite films by lowering the seal initiation temperature of the sealant layer such that high bag-making speeds can be maintained with lower setpoint temperatures and a broader heat sealing window on the sealing bars.

Aside from lower sealing initiation temperature (SIT), heat seal strength can also significantly impact the heat sealing performance. High plateau seal strength is the key to improve the overall heat sealing performance in terms of the hermeticity of a sealed package. Hermeticity means that there are no voids and tunnels formed inside the sealed area and no leaks due to the failure resulted from weak heat seal strength.

Thus, it is often desirable to have heat sealable films and laminations with a low sealing initiation temperature, broaden heat sealing temperature window and higher plateau heat seal strength. Lowering heat sealing temperatures can improve productivity of packaging machines and help lower overall product costs. The hermeticity of packages with higher plateau heat seal strength can be improved by preventing from the formation of voids, tunnels, leaks and failure in the sealed area.

The properties of the composites or alloys or blends of different biodegradable bioplastics have been intensely studied for the applications required by packaging materials, particularly, industrial compostable, home compostable, soil biodegradable, freshwater biodegradable, and marine biodegradable, however, none of them have demonstrated improved heat sealing performance in terms of sealing initiation temperature and hermeticity.

Narancic et al. published their studies on the biodegradation of individual biopolymers and their blends as well (Article: Environ. Sci. Technol. 2018, 52, 10441-10452). The authors disclosed in their study that thermoplastic starch (TPS) and polyhydroxybutyrate (PHB) resins are the only two individual bioplastics passed the biodegradation test across all seven test environments based on the requirements of international biodegradation standards. Although crystalline polylactic acid (NatureWorks Ingeo™ PLA4043D) is not home compostable, a blend of PLA/PCL at the ratio of 80/20 passed home composting test. Polycaprolactone (PCL) CAPA6500D functioned as a promoter of biodegradation for PLA at test temperature 28±2° C. The authors also disclosed that both polybutylene succinate (PBS) and polyhydroxyoctanoate (PHO) are not home compostable at the test temperature, but they become home compostable as they are blended with a biodegradation promoter such as PHB and PCL at a ratio favorable for biodegradation. Therefore, there might exist biodegradable biopolymers or additives which function as biodegradation promoters which can change and enhance the mechanism of biodegradation of polylactic acid resin to biodegrade at lower temperatures. The study disclosed in the article does not teach how to make a home compostable film using the polymer blends and how to improve the heat sealing properties or characteristics of such a biodegradable composite film.

U.S. Pat. No. 9,238,342 describes a multi-layer biaxially oriented PLA composite film (PLA-rich composition) that is a heat sealable film with a significantly reduced noise level, which is related to a reduction in film modulus. The modulus level of the oriented film was reduced by incorporating low Tg modifiers which are a biodegradable polymer A and an elastomer E into the core layer of the oriented structure as sound dampening materials. The biodegradable polymer A includes low Tg flexible polymers such as polyhydroxyalkanoates (PHA), polyhydroxybutyratevalerate (PHBV), poly caprolactone (PCL), polybutylene-adipate-co-terephthalate (PBAT), polybutylene-succinate (PBS), polybutylene-succinate-adipate (PBSA) or mixtures thereof. The glass transition temperature of polymer A is ≤0° C., the content of polymer A in the core layer is 20 wt %≤wt % (A)≤40 wt % (wt %=percentage by weight). Elastomer E is modified polyolefin rubbery polymers such SEBS Kraton™ FG 1924 and BIOMAX SG 120. The content of the elastomer E is 1%≤wt % (E)≤10%. However, the invented film was only designed for industrial composting application, and the heat initiation temperature (as high as 210° F.) of the soft oriented film was not reduced to a lower level as the heat resistance of the core layer is reduced. Such a soft film with high SIT (210° F.) can have heat distortion issue in bag forming process.

U.S. Pat. No. 9,150,004 describes a method of reducing the seal initiation temperature (SIT) of a biaxially oriented PLA film by modifying the amorphous PLA sealant layer with low Tg biodegradable bioplastics. The SIT of the inventive BOPLA film was reduced from 195° F. for PLA control film to as low as 170° F. for the invented film. However, the plateau seal strength of the inventive film was not improved at about a range of 290 to 370 g/in, indicating there is no function of hermeti city.

U.S. Pat. No. 9,074,042 describes a single-layer biaxially oriented film made from modified lactide copolymer (polyethylene glycol (PEG), PEG-modified-PLA), the oriented film is very flexible and has high elongation rate and low modulus compared to that of PLA control film. The disclosed oriented film is flexible but not designed for either home compostable or heat sealing application.

JP2013147580A describes a method of producing a polylactic acid based oriented film with excellent gas barrier and a low noise level by adding modified flexible resins to improve the flexibility of PLA based film. The flexible resins include PLA-PEG-PLA block copolymer, BASF Ecoflex™ FBX 7011 resin, and PHBV resins.

WO2021185339A1 describes a biodegradable resin composition produced by the method of TORAY NANOALLOY™ TECHNOLOGY comprising at least 70 wt % polylactic acid resin; and 5 to 29.9 wt % biodegradable polymers selected from the biopolymers of PCL, PBS, PBAT, PHA, poly(propylene carbonate) (PPC) and poly(glycolic acid) (PGA) or mixture thereof and 0.1 to 10 wt % aliphatic carboxylic acids as well as an amount of 50 to 500 ppm metal elements. It is disclosed that the biodegradable PLA-rich composition was extruded and biaxially oriented into a 20 μm thick film, the invented film exhibited improved biodegradability under home composting test condition (following ASTM5338-15 test procedures except for that the test temperature is 28° C.), compared to that of conventional BOPLA film.

U.S. Pat. No. 9,120,911 describes a resin composition resin (PLA-rich composition) comprising at least 70 wt % polylactic acid, and 1 to 30 wt % plasticizer which is preferably 1,4:3,6-dianhydrohexitol alkyl ester (IDE) with excellent compatibility to PLA. The resin composition after pelletizing was made into sheet samples by Carver hot press. IDE-modified PLA sheet samples showed a significant reduction in modulus and tensile strength, and a huge increase in elongation at break. The glass transition temperature of the IDE-modified PLA was reduced from 58° C. (the Tg of PLA) to 32° C., the Young's modulus was reduced from 3602 MPa to 1240 MPa, resulting in a film with a much lower level of noise. However, the invention does not disclose how to make a packaging film from the IDE-modified PLA composition. Plasticizers could potentially impact the biodegradation, physical properties, heat resistance, additive migration, heat sealing performance as well as processability of the packaging film.

USPTO Pub. No.: US2021/0277226A1 describes a biodegradable composition (PLA-rich composition) comprising PLA resins, plasticizers, compatibilizers, and enzymes. Lactic acid oligomers (LAO) and compatibilizers significantly increase the tear resistance and elongation at break of bioplastic films. Enzymes well dispersed into PLA resins can improve PLA-biodegrading activity. All inventive PLA-based film articles show high toughness and high depolymerization rate. Higher degradation rate could indicate that enzymes in the presence promote the biodegradation of PLA resin. However, the invention does not teach how to make a heat sealable film for food packaging which is home compostable.

The inventors seek to make a biodegradable compostable composite film with improved heat sealability and compostability.

SUMMARY OF INVENTION

An embodiment relates to a film comprising a core layer and a heat sealant layer; wherein the core layer comprises PLA resin and a non-PLA modifier X, wherein the core layer has an amount of PLA resin more than 60 wt % of a total weight of the core layer; wherein the non-PLA modifier X has a glass transition temperature of Tg≤10° C. and a melting temperature of 56° C.≤Tm≤180° C.; wherein an amount of the modifier X is less than 40 wt % of the total weight of the core layer; wherein the heat sealant layer comprises an amorphous PLA and a modifier Y having a glass transition temperature of Tg≤0° C. and a peak melting temperature of 56° C.≤Tm≤90° C.; wherein the film is biaxially oriented compostable composite film having a seal initiation temperature less than 176° F., a plateau seal strength higher than 800 g/in, and a heat sealing temperature window of from 152 to 240° F., and a gloss measured from the heat sealant layer at 20° angle in accordance with ASTM D2457 is less than 80.

In an embodiment, the heat sealant layer comprises the amorphous PLA in an amount of at least 20 wt % of the total weight of the heat sealant layer.

In an embodiment, the heat sealant layer comprises the amorphous PLA in the amount of about 20 wt % to about 60 wt % of the total weight of the heat sealant layer.

In an embodiment, the modifier Y comprises polybutylene succinate-co-adipate (PBSA) or polycaprolactone (PCL) or other biodegradable polymers with a glass transition temperature of Tg≤0° C. or mixture thereof.

In an embodiment, an amount of the PCL is at least 5 wt % of a total weight of the heat sealant layer.

In an embodiment, the amount of the PCL is about 5 wt % to about 35 wt % of the total weight of the heat sealant layer.

In an embodiment, an amount of the PBSA is at least 20 wt % of a total weight of the heat sealant layer.

In an embodiment, the amount of the PBSA is about 20 wt % to about 70 wt % of the total weight of the heat sealant layer.

In an embodiment, the sealant layer polymer is an amount of 5 wt % to 25 wt % of the total weight of the core layer.

In an embodiment, wherein the core layer comprises PLA resin at least an amount of 60 wt % of a total weight of the core layer, wherein the core layer comprises semi-crytalline PLA resin at least an amount of 35 wt % of a total weight of the core layer.

In an embodiment, the modifier X comprises PBS, PBSA, PCL, PHBV, PHA or other biodegradable polymers or mixture thereof with a glass transition temperature of Tg≤10° C. and a melting point of 56 to 180° C. PHBV is a PHA resin but with a high Tm.

In an embodiment, the modifier X further comprises a PBAT resin.

In an embodiment, the polymer further comprises an amorphous polymer with a glass transition temperature of Tg≤10° C.

In an embodiment, the core layer further comprises a processing aid, a chain extender, a nucleating agent, a biodegradable promoter, a plasticizer, or a filler or mixture thereof, In an embodiment, the biodegradable promoter comprises an enzyme or hydrolytic promoter and wherein the filler comprises inorganic particles and/or a slip additive.

In an embodiment, the inorganic particles comprise CaCO3 or TiO2 or mixture thereof.

In an embodiment, the film further comprises a skin layer having the core layer at one side and opposite to the heat sealant layer.

In an embodiment, the skin layer is either is a printing ink receiving layer, a metal receiving layer or a coating receiving layer.

In an embodiment, the skin layer has a composition same as the core layer.

In an embodiment, the core layer has a composition different than the core layer.

In an embodiment, the heat sealant layer comprises an amount of antiblock particles with a spherical size of 2 to 6 μm.

In an embodiment, a loading of the antiblock particles is in the range of 100 to 5000 PPM of a total weight of the heat sealant layer.

In an embodiment, the heat sealant layer comprises a migratory slip additive.

In an embodiment, a loading of the migratory slip additive is in the range of 500 to 5000 ppm of a total weight of the heat sealant layer.

In an embodiment, the skin layer comprises an antiblock particles with a spherical size of about 2 μm to 3 μm.

In an embodiment, the antiblock particles in the skin layer are in amount of 100 to 5000 ppm of a total weight of the skin layer.

In an embodiment, the film is configured to be a print film has the core layer comprising migratory particles in an amount of 500 to 1000 ppm.

In an embodiment, the film is configured for metallization has the core layer devoid of migratory particles.

In an embodiment, a thickness of the film is about 10 μm to about 50 μm.

In an embodiment, the thickness of the film is about 15 μm to about 25 μm.

In an embodiment, the heat sealant layer has a thickness of about 1 μm to about 5 μm.

In an embodiment, the heat sealant layer has the thickness of about 2 μm to about 4 μm.

In an embodiment, the skin layer has a thickness of about 1 μm to about 3 μm.

In an embodiment, the skin layer has a thickness of about 1 μm to about 2 μm.

In an embodiment, wherein the film has a haze in the range of 8 to 14%.

In an embodiment, the film has a modulus of 2400 to 3000 MPa in machine direction and a modulus of 2400 to 3400 MPa in transverse direction.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

In an embodiment, the present invention provides a method to make a compostable composite film using the polymer blends to improve the heat sealing properties or characteristics of the biodegradable composite film.

In an embodiment, discloses the method of making heat sealable film suitable for snack food packaging, in particular, heat sealing properties are required for the packaging.

In an embodiment, the invention provides a method for a heat sealable film for food packaging which has improved compostability In an embodiment, the invention provides a packaging film from the IDE-modified PLA composition.

In an embodiment, the film is not only designed for industrial composting application. In an embodiment, there is no heat distortion issue in bag forming process.

In an embodiment, the oriented film is flexible and designed for either home compostable or heat sealing application.

DETAILED DESCRIPTION

Definitions and General Techniques

For simplicity and clarity of illustration, the figures illustrate the general manner of construction, and descriptions and details of well-known features and techniques may be omitted to avoid unnecessarily obscuring the present disclosure. Additionally, elements in the figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items, and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As defined herein, two or more elements are "integral" if they are comprised of the same piece of material. As defined herein, two or more elements are "non-integral" if each is comprised of a different piece of material.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

"Polymer" is a macromolecule compound prepared by polymerizing monomers of the same or different type. Polymer includes homopolymers, copolymers, terpolymers, tetrapolymer, interpolymers, and so on. The term 'homopolymer' when the monomer/repeating unit is same in the polymer chain. The term, 'copolymer' is a polymer derived from more than one species of monomers or comonomers. The term, 'terpolymer' is a polymer made by polymerizing three different monomers. Terpolymers are produced, for example, by grafting a third monomer onto a dimer of two different monomers (graft copolymerization), bulk polymerization or also random copolymerization of three monomers. An example of terpolymer is acrylonitrile-butadiene-styrene copolymer (ABS). Tetrapolymer (which usually refers to polymers prepared from four different types of monomers or comonomers), and the like. The term "interpolymer" means a polymer prepared by the polymerization of at least two types of monomers or comonomers.

In an embodiment, polymers could include additional additives. The polymer is interchangeable used as "resin".

"Biaxially oriented film" is a film that is stretched in both machine and transverse directions, producing molecular chain orientation sequentially or simultaneously in two directions.

"Amorphous resin" has a randomly ordered molecular structure which does not have a sharp melting point. Such resin soften gradually as the temperature rises.

"Glass transition temperature, Tg" is a thermal property associated with the segmental mobility of polymer chains, characterized as softening or solidifying; which in turn governs the toughness and other physical properties of the material.

"Biodegradable Bioplastics" or "Biodegradable Film" or "Compostable Composite Film" or similar refer to polymeric materials that are 'capable of undergoing decomposition into carbon dioxide, methane, water, inorganic compounds, or biomass in which the predominant mechanism is the enzymatic action of microorganisms, that can be measured by standardized tests, in a specified period of time, reflecting available disposal condition'. In an embodiment, more than 50%, 60%, 70%, 80%, 90% of the film could be degraded by the microbial action. In an embodiment, the film could be fully degraded by the microbial action. In an embodiment, the biodegradable film has a home composting property as per AS 5810-2010 standard.

"Crystallinity" refers to the degree of structural order in a solid. In a crystal, the atoms or molecules are arranged in a regular, periodic manner. The degree of crystallinity has a big influence on hardness, stiffness, density, transparency, and diffusion. In an embodiment, the resin has a crystallinity more than 30%, 40%, 50%, 60%, 70%, 80%.

"Semi-crystalline" or "semicrystalline" refers to a polymer that exhibits organized and tightly packed molecular chains. The areas of crystallinity are called spherulites and can vary in shape and size with amorphous areas existing between the crystalline areas. As a result, this highly organized molecular structure results in a defined melting point. These polymers are anisotropic in flow. In an embodiment, the semi-crystalline resin has a crystallinity more than 30%, 40%, 50%, 60%, 70%, 80%.

"Modifier" refers to materials that are added into the resin to improve the properties of a biaxially oriented composite film such as but not limited to improving heat-sealability, mechanical strength (flexibility, modulus, tensile strength, elongation, etc.), biodegradability, compostability, optical properties, and surface properties so on. In an embodiment, modifier could be added in the resin during an appropriate step of polymerization, melt compounding and dry blending processes at a desirable amount.

In an embodiment, Modifier is a non-PLA based modifier.

Modifier X refers to low Tg flexible polymers and additives. The modifier X comprises biopolymers having a glass transition temperature of $Tg \leq 10°$ C. and a melting temperature of in the range of 56 to 180° C. It includes for example but not limited to PBS, PBSA, PCL, PBAT, and all semi-crystalline PHAs, including PHBV having a melting temperature of 175 to 180° C. The modifier X comprises less than 10 wt % of amorphous polymers with a glass transition temperature of $Tg \leq 10°$ C. (the restriction will include the use of either petroleum-based or bio-based rubbery materials to achieve the same purpose as that of low Tg semi-crystalline polymer in terms modulus reduction).

Modifier Y refers to but not limited to polybutylene succinate-co-adipate (PBSA) or polycaprolactone (PCL) or other biodegradable polymers with a glass transition temperature of $Tg \leq 0°$ C. and a melting point of 56 to 90° C. or mixture thereof.

An embodiment relates to a solution that lowers the heat seal initiation temperature (SIT), enhance the plateau heat seal strength, and broadens the heat seal range of typical amorphous PLA (Polylactic acid) heat seal resins. Formulations that accomplish this goal as well as being miscible with PLA resin, resulting in acceptably clear, transparent film, as well as maintaining the compostability of the oriented biodegradable composite film based on PLA-rich composition. It is also contemplated to use this formulation as part of a metallized BOPLA film or opaque BOPLA films, or combinations thereof. The oriented biodegradable composite films include a heat sealable layer comprising 20 to 60 wt % amorphous polylactic acid resins; 20 to 70 wt % polybutylene succinate co-adipate (PBSA) resins; 5 to 35 wt % PCL resins; and 0.05 to 3 wt % slip and antiblocking agents for slip and blocking control.

In an embodiment, a second layer (B) which is the core layer including a modified PLA-rich (PLA content by weight is ≥60%) biodegradable composite on one side of the sealable layer. This second biodegradable composite layer (B) could be considered as the base layer to provide the bulk strength of the coextruded laminate film.

In one embodiment, the core layer (B) comprise a modified PLA-rich (PLA wt %≥60%) biodegradable composite comprising PLA resins, preferably, crystalline PLA resins, certified home compostable polymeric resins with a glass transition temperature of $Tg \leq 10°$ C. such as PBSA and PCL, PBAT, and PHA resins, and optionally an amount of enzymes, aliphatic acids, and plasticizers or mixture thereof that act as processing aids or hydrolytic promoter or the combination thereof to enable PLA resins in the core layer compostable at lower composting temperature.

In another embodiment, the core layer (B) may include flexible biodegradable polymers with a glass transition temperature of Tg≤10° C. and a melting temperature of 56° C.≤Tm≤180° C. such as PCL, PBSA, and PHA polymers working together with those flexible biodegradable polymers in the heat seal layer (C) to improve the hermeticity and increasing the plateau heat seal strength reducing the SIT. Preferably, a total amount of the indicated flexible biodegradable polymers added in the core layer is in the range of 5 to 30 wt % of the total weight of the core layer (B) for improved hermeticity.

In yet another embodiment, the core layer (B) can also include inorganic antiblock particles, fillers and slip additives selected from amorphous silicas, aluminosilicates, sodium calcium aluminum silicates, calcium carbonate, crosslinked silicone polymers, and/or polymethylmethacrylates to act as antiblocks for film handling or machinability. Suitable amounts range from 0.03 wt. % to 0.5 wt. % of the core layer and typical particle sizes of 2.0-6.0 μm in diameter. If so desired, cavitating agents may be added to the core layer (B) such that upon biaxial orientation, voids are formed within this layer, thus rendering the film a matte or opaque and often, pearlescent white appearance. Such cavitating agents may in inorganic particles such as calcium carbonate, talc, or other minerals; or polymeric cavitating agents such as polystyrene, cyclic olefin copolymer, or other polymers. Titanium oxides may also be incorporated with the cavitating agent to provide a brighter white appearance.

In an embodiment, to improve the heat sealability of the heat sealable layer (C), semi-crystalline polycaprolactone (PCL) and polybutylene succinate-co-adipate (PBSA) are selected to be dry-blended or melt-blended with the amorphous PLA resin. The heat seal resin composition comprises 20 to 60 wt % amorphous polylactic acid resins; 20 to 70 wt % polybutylene succinate co-adipate (PBSA) resins; 5 to 35 wt % PCL resins; and 0.05 to 3 wt % slip and antiblocking agents for slip and blocking control.

In an embodiment, the modifier resins PCL and PBSA in the loading range in the invention have been found not only to sufficiently lower the seal initiation temperature, broaden the heat sealing temperature window, and enhance the plateau seal strength, but also maintain the processability during film-making as well as to help keep the sealant layer home compostable. Both PCL and PBSA can crystallize much faster than semi-crystalline PHA resins or PBAT resins, and they have a sharp crystallization peak, indicating less defect in the crystals of PCL and PBSA, as they cool in sealing process compared to PHA resins. Quick solidifying and crystallization provide a huge advantage to heat sealing performance and lowering heat sealing cycle time. In addition, both polymers also have the advantage of being fully biodegradable and home compostable and promoting the home compostability of amorphous PLA resins. This is important to maintain the overall biodegradability and/or compostability of the whole multi-layer film structure.

In an embodiment, the semi-crystalline biopolymeric resins PCL and PBSA have a melting temperature in the range of 56° C.≤Tm≤90° C. and a glass transition temperature lower than 0° C. (Tg≤0° C.). Therefore, the sealant layer can have a function of preventing from easy blocking in the hot weather conditions such as a summer season and improved SIT by at least 30° F. In the current invention, the SIT is reduced from 193° F. (a SIT of amorphous PLA sealant layer in the PLA control film) to 152° F. and in the meantime home compostability of the heat sealant layer per AS 5810-2010 standard is maintained in less than 12 months.

In an embodiment, the meantime home compostability of the heat sealant layer per AS 5810-2010 standard is maintained in less than 11 months, 10 months, 9 months, 8 months, 7 months, 6 months, 5 months or less months. The quick disintegration of the sealant layer resulted from improved compostability may help the compostability of the total film structure of a film product.

In an embodiment, the laminate could further include a third layer (A) on the core layer (B), opposite the heat sealable layer (C) for use as a printing layer (i.e. printing ink receiving layer) or metal receiving layer or coating receiving layer. This third layer (A) of this laminate can comprise a modified PLA-rich composite which are either the same as the composite in the core layer or a different blend or a mixture thereof. This third layer (A) could also incorporate various additives such as antiblock particles for film-handling purposes. If desired, this third layer (A) could also include the same or similar composition as the inventive sealable layer (C), thus rendering the overall multi-layer film a two-side sealable film.

In an embodiment, the heat sealable layer (C) can include an antiblock component selected from the group consisting of amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03 to 2 wt % of the heat sealable layer and typical particle sizes of 2.0-6.0 μm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

In the embodiment of a three-layer coextruded film structure, the third PLA-based layer (A) can include similar amounts of antiblock and slip additives as the respective core and heat sealable layers, although the amounts are likely to be optimized for performance. In this embodiment, it is not necessary for the core layer (B) to include antiblock particles (although migratory additives may still be included in the core layer as a reservoir from which such additives may migrate to the outer surface layers as desired).

In the case where the above embodiments are to be used as a substrate for vacuum deposition metallizing, in an embodiment, migratory slip additives not to be used as these types of materials may adversely affect the metal adhesion or metallized gas barrier properties of the metallized BOPLA film. It is thought that as the hot metal vapor condenses on the film substrate, such fatty amides or silicone oils on the surface of the film could vaporize and cause pin-holing of the metal-deposited layer, thus compromising gas barrier properties. Thus, only non-migratory antiblock materials should be used to control COF and web-handling.

In the case where the above embodiments are to be used as a printing film, in an embodiment, it may be advisable to avoid the use of silicone oils, in particular low molecular weight oils, as these may interfere with the print quality of certain ink systems used in process printing applications. However, this depends greatly upon the ink system and printing process used.

In an embodiment, for these multi-layer film structures described above, it is preferable to discharge-treat the side of this multi-layer film structure opposite the first heat sealable layer (C) for lamination, metallizing, printing, or coating. Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of CO2 and N2 to the exclusion of O2.

In an embodiment, the laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum, although other metals can be contemplated such as titanium, vanadium, chromium, manganese, iron, cobalt, nickel, copper, zinc, gold, or palladium, or alloys or blends thereof.

In an embodiment, multi-layer biodegradable composite film was made using a process of coextrusion and sequential orientation. The laminate was coextruded at temperatures of about 160° C. to 210° C. through a 12-inch wide die, cast at a casting speed of about 6 meter per minute (mpm) on a chill drum with temperatures controlled between 15° C. and 30° C. using an electrostatic pinner, and then oriented in the machine direction 2 to 3.5 times through a series of heated and differentially sped rolls controlled at about 50° C. to 65° C., followed by transverse direction stretching about 3 to 5.0 times in a tenter oven with temperatures controlled at about 75° C. to90 ° C. and then annealed at about 90° C. to 140° C. to reduce internal stresses to minimize shrinkage and give a relatively thermally stable biaxially oriented sheet. It is also beneficial to relax about 5 to 15% of the maximum width of the tenter orientation in the stretching section.

In an embodiment, this invention provides a method to allow the production of improving the heat sealing performance of a biaxially oriented compostable composite film using biodegradable and compostable modifiers. Such a film method and composition can result in faster packaging speeds with less issues in distortion and heat sealing failure while maintaining attractive appearance, and compostability.

In an embodiment, this invention relates to a multi-layer biaxially oriented compostable composite film with a formulation to improve the heat seal initiation and hermeticity of heat sealing while maintaining good optical clarity of the film's appearance, compostability, as well as reduction in modulus level for sound dampening in the composite film. The invention involves the use of certified home compostable polymeric resins with low a glass transition temperature of Tg≤10° C. and a melting temperature of 56° C.≤Tm≥180° C. formulated with PLA resin in the core layer to improve the compostability and sealability of the composite film for packaging applications, providing a film with good hermeticity, good optical clarity, and lower modulus level for noise reduction.

In one embodiment of the invention, the laminate film includes a two-layer biaxially oriented coextruded film of a core layer (B) including a modified PLA-rich biodegradable composite and a heat sealable layer (C) including amorphous polylactic acid (PLA), poly(butylene succinate-co-adipate) (PBSA), and polycaprolactone (PCL). The side of the core layer (B) opposite the heat sealable layer (C) can be discharge-treated.

In another embodiment of the inventive multi-layer film, the film includes a second outer skin layer (A) disposed on the side of the core layer (B) opposite the heat sealable layer (C). This second outer skin layer (A) can comprise the same biodegradable composite as in the core layer or a blend of different biodegradable polymers and a small amount of slip or antiblocking additives. Generally, it is desirable to discharge-treat the exposed surface of this outer skin layer in order to provide further functionality as a surface to receive metallization, printing, coating, or laminating adhesives.

Core Layer (B)

In an embodiment, the core layer (B) comprises a modified PLA-rich (PLA wt %≥60) biodegradable composite comprising PLA resins, preferably, crystalline PLA resins.

In an embodiment, the core layer has PLA resin in an amount about 60 wt %, 65 wt %, 70 wt %, 75 wt %, 80 wt %, 85 wt %, 90 wt %, 95 wt % or more of the total weight of the core layer.

In an embodiment, the core layer comprises low Tg flexible polymeric resins such as PBAT, PBS, PBSA, PCL, PBHV (which is a PHA resin but with a Tm of 175 to 180° C.), semi-crystalline PHA (−5° C.≤Tg≤10° C.), amorphous PHA (Tg≤−10° C.), a small amount of rubbery petroleum-based elastomer such as Kraton™ FG polymer and BIOMAX SG 120, and a small amount of enzymes, aliphatic acids and plasticizers or mixture thereof that act as a hydrolytic promoter to enable PLA resins in the core layer compostable under lower temperatures. The flexible biodegradable semi-crystalline polymers have a glass transition temperature of Tg≤10° C. and a melting temperature Tm in the range of from 56° C. to 180° C., resulting in hermetic sealing performance together with the modifier resins in the heat sealable layer. Preferably, the amount of the low Tg flexible biodegradable polymer is in the range of 5 wt % to 30 wt % the total weight of the core layer, with minimum value selected from 5 wt %, 7 wt %, 10 wt %, 12 wt %, 15 wt %, 20 wt % and the maximum value selected from 30 wt %, 25 wt %, 20 wt %, 10 wt % of the total weight of the core layer.

In an embodiment, the core layer has crystalline PHA resin, amorphous PHA resin, certified home compostable polymeric resins with glass transition temperature Tg≤0° C. such as PBSA and PCL, and an amount of crystalline PLA resins (20%≤PLA wt %≤40%) to enhance the bulk strength of the coextruded laminate film. Preferably, an amount of 5 to 30 wt % flexible biodegradable polymers PCL or PBSA is added into the core layer to improve hermeticity, with minimum value selected from 5 wt %, 7 wt %, 10 wt %, 12 wt %, 15 wt %, 20 wt % and the maximum value selected from 30 wt %, 25 wt %, 20 wt %, 10 wt % of the total weight of the core layer.

As PHA resins are used as low Tg flexible biopolymer in the core layer less than 30 wt %, the Tm of semi-crystalline PLA resins used in PLA-rich core layer is preferably in the range of 145 to 155° C. since PHA resins are not thermally stable at extrusion temperature higher that 165° C. In an embodiment, the melting temperature of PHA resins is lower than 180° C., 155° C., 150° C., 145° C., 140° C., 135° C., 130° C. or lower.

In an embodiment, suitable examples of crystalline PLA for this invention include NatureWorks® Ingeo™ PLA4032D and PLA4043D or PLA2003D or Total Energies Corbion Luminy® LX575 and LX175. These resins have a melt flow rate of about 3.9-4.1 9/10 min. at 190° C./2.16 Kg test condition, a crystallization temperature of about 145-170° C., a glass transition temperature of about 55-62° C., a density of about 1.25 g/cm3. Molecular weight Mw is typically about 200,000; Mn typically about 100,000; polydispersity about 2.0. PLA4032D and LX575 has a melting point of about 165-173° C., which are more preferred crystalline PLA resins for thermal resistance application. Ingeo™ PLA4043D and Luminy® LX175 has a melting point of about 145-152° C., lower Tm melting temperature of those PLA resins have the advantages of the capability of being extruded at lower extrusion temperatures as blended with biopolymers with poor thermal stability such as PHA resins.

In an embodiment, suitable amorphous PLA resins for this invention include NatureWorks® Ingeo™ 4060D and TotalEnergies Corbion Luminy® LX975. Those resins have a relative viscosity of about 3.25-3.75, a glass transition temperature of Tg about 52-60° C. (softening temperature), heat seal initiation temperature of about 93° C., a density of about 1.24 g/cm3. Molecular weight Mw is about 180,000 g/mole. As it has been well known that there are no melting temperatures for amorphous PLA resins. As amorphous PLA resins are heated to their glass transition temperature Tg around 56° C., the PLA chains can flow, and form entanglements, which create seals (solidifying) as the PLA chains are cooled to the temperatures lower than Tg 56° C.

In an embodiment, examples of low Tg flexible home compostable biopolymers include polybutylene succinate-co-adipate (PBSA) resins and polycaprolactone (PCL) resins. One example of PBSA resins could be PTT MCC BioPBS™ FD92PM, which has a glass transition temperature (Tg) −47° C. and a melting temperature (Tm) 87° C., and a melt flow index 4 grams/10 min. at 190° C./2.16 Kg standard condition. One example of PCL resins could be Ingevity CAPA® 6500D or CAPA® 6800D, which has a glass transition temperature (Tg) about −60° C. and a melting temperature (Tm) about 58° C. and melt flow index of 18 g/10 min. and 2.4 g/10 min. for CAPA6800D tested with 2.16 kg load and 1" PVC die at 160° C. Those biodegradable polymers are certified for both industrial composting and home composting by TUV Austria Group.

In an embodiment, examples of certified industrial compostable low Tg biopolymers include poly(butylene adipate-co-butylene-terephthalate) (PBAT) resins. One example of PBAT resins could be BASF ecoflex® C1200, which has a density of about 1.25 g/cm3, a glass transition temperature of about −30° C. However, The PBAT melts between 50° C. and 150° C. with a flat peak at about 120° C. and has a very low crystallinity of only around 15%. a Vicat softness of about 91° C., it is a very rubbery and soft biopolymer. Ecoflex® C1200 can provide good effects on modulus reduction and sound dampening. Unfortunately, PBAT is not certified for home compostable application.

In an embodiment, TianAn Enmat™ Y1000P, poly(3-hydroxybutyrate-co-3-hydroxyvalerate) (PHBV) has only about 1.5 mol % 3-hydroxyvalerate (3HV) in the copolymer chain. Short chain segment 3HV can incorporate into PHB crystals, leading to a high melting point of 175 to 180° C. and a high crystallinity (78%) based on DSC test result. PHBV has a glass transition temperature of about 2° C. similar to that of other semi-crystalline PHA resins, and a melt flow index 8 to 15 g/10 min., and a density of 1.25 g/cm3. A reversed extrusion temperature profile is preferably needed to extrude the PHBV resin for preventing from significant thermal degradation, preferably, an amount of low Tm flexible biopolymers, amorphous biopolymers, and plasticizers or mixture thereof is being blended into the PHBV resin in the core layer as processing aids or lubricants in extrusion to facilitate PHBV melting in extrusion so the thermomechanically induced degradation of PHBV can be eliminated to a minimum level.

In an embodiment, PHA resins with a side chain longer than three carbons Poly(3HB-co-3HZ) are reported in the article published by Noda et. al. (book chapter: Nodax™ Class PHA Copolymers: Their Properties and Applications; Book: Plastics from Bacteria pp 237-255). The longer chains in PHA resins include 3-hydroxyoctanoate(3HO), 3-hydroxyhexanoate(3HHx), and 3-hydroxydecanoate (3HD). Noda et. al. reported that the crystallinity of those PHA resins with longer side chains is in the range of 35 to 42% (FIG. 8 of the article); Those PHA resins listed in the art have a glass temperature of −2.5 to 2.5° C. (FIG. 9); and a melting temperature of 125 to 145° C. (FIG. 7 of the article). However, the authors also reported that those PHA resins have Young's modulus only at the levels of oriented HDPE films (FIG. 12 of the article), which is much lower than that of BOPP film used in food packaging. In recent practice of "End of Life", oriented HDPE film has been noted that it is insufficient in both tensile strength and modulus to be a good packaging material to replace the current BOPP packaging materials in the market. Optimal Young's modulus for desirable food packaging needs to reach the modulus levels of BOPP films. In comparison, the crystallinity of homopolypropylene resins used in making food packaging films in the market is about in the range of 60 to70%, which is much higher than that of PHA resins (35 to 42%) with longer side chains. In addition, the melting temperature of homopolypropylene is in the range of 160 to 170° C., which is much higher than that of PHA resins (125 to 145° C.) with longer side chain. Both the lower crystallinity and low melting temperature of PHA resins (Tg is about the same as that of homopolypropylene) with longer side chain result in lower heat resistance and higher heat shrinkage.

In an embodiment, the core layer (B) further comprises a minority amount of multi-functional epoxidized reactive polymeric or maleic anhydride grafted elastomer materials as chain extender or processing aids or compatibilizer or combination thereof. The epoxy groups on the chain of polymeric materials added in the core layer can chemically react with the chain end groups (—COOH) of polyesters. The maleic anhydride group on the elastomers such as Kraton SEBS polymer can chemically react with the end groups (—OH) of polyester. Particularly, a polymeric chain extender can help increase or maintain the melt strength during the extrusion of making a film.

In an embodiment, suitable examples of chain extenders include BASF Joncryl ADR 4468, which has a high number of epoxy group per chain. Suitable amounts of polymeric chain extenders to be blended in the core layer is from 0.1 to 1.5 wt % of the core layer, preferably 0.3 to 1.2 wt %, more preferably, 03 to 0.5 wt %.

In an embodiment, suitable examples of multi-functional reactive polymeric resins include amorphous maleic anhydride modified SEBS Kraton™ FG 1924 polymer and Dow Biomax® SG 120. Kraton™ FG 1924 polymer is an amorphous elastomer having a glass transition temperature of −90° C. for its polybutadiene blocks and a Tg of 100° C. for its polystyrene blocks, the weight percentage of polystyrene blocks is only about 17 wt %. Therefore, FG 1924 is a very rubbery material with excellent flexibility for modification at a low loading amount. Biomax SG 120 is a type of epoxidized ethylene-acrylate copolymers or terpolymers (non-biodegradable polyolefin elastomers) with contemplated structures of ethylene-n-butyl acrylate-glycidyl methacrylate, ethylene-methyl acrylate-glycidyl methacrylate, ethylene-glycidyl methacrylate, or blends thereof. This additive has a density of about 0.94 g/cm3, a melt flow rate of about 12 g/10 min. at 190° C./2.16 kg test condition, a melting point of about 72° C., and a glass transition temperature of about −55° C.

Suitable amounts of low Tg petroleum-based elastomer copolymers to be blended in the core layer is from 1 to 8 wt % of the core layer, preferably, 2 to 4 wt % because of the characteristics of non-biodegradability, more preferably, 0.5 to 2 wt % as the modifier is a compatibilizer. The acceptable concentrations of chain extender or epoxidized ethylene-acrylate copolymers added into the core layer of biaxially oriented composite film are determined by the aspects of processability, clarity, and home compostability.

In an embodiment, furthermore, an option component of the core layer (B) could be a minority mount of enzymes, aliphatic acids, and plasticizers, metal salts, or mixture thereof that act as processing aids or hydrolytic promoters or the combination thereof to enable PLA resins in the core layer home compostable.

In an embodiment, hermeticity of the heat sealing of a biodegradable composite film can be improved by adding either amorphous PLA resins or low Tg flexible biopolymers as modifiers into the core layer of a biodegradable composite film, more preferably, semi-crytalline biopolymers. However, it should be noted that high loading in modifiers (amorphous PLA and low Tg polymeric modifiers and low molecular weight additives) in the core layer (e.g. 50% or greater) can cause high thermal shrinkage rates after biaxial orientation and in spite of heat-setting conditions in the transverse orientation oven to make a thermally stable film. A thermally, dimensionally stable film is important if the substrate is to be used as a metallizing, printing, coating, or laminating substrate due to the heating elements or factors in downstream processes. However, if the oriented biodegradable composite film is desired as a heat shrinkable film, this composition and appropriate processing conditions might be suitable.

In the embodiment of a two-layer coextruded multilayer film, it may be useful to also add a desirable amount of suitable antiblock particles and/or migratory slip additives in the art to the core layer (B) to control COF properties. However, if the films of this invention are desired to be used for metallizing or high definition process printing, it is recommended that the use of migratory slip additives be avoided in order to maintain metallized barrier properties and adhesion or to maintain high printing quality in terms of ink adhesion and reduced ink dot gain. In this case, it is recommended that coefficient of friction control and web handling be resolved using inorganic antiblock particles similar to those already described.

In this embodiment of a two-layer coextruded multilayer film, the core resin layer can be surface treated on the side opposite the skin layer by those well-known skills in the art. This treated core layer is then well suited for subsequent purposes of metallizing, printing, coating, or laminating, the preferably embodiment being for printing.

In an embodiment, the core resin layer (B) is typically 8 μm to 100 μm in thickness after biaxial orientation, preferably between 10 μm and 50 μm, and more preferably between about 15 μm and 25 μm in thickness. A preferred embodiment is to use the higher crystalline, higher L-lactide content PLA such as Ingeo® 4032D and Luminy® LX575 to achieve lower heat shrinkage and better thermal stability if home compostability could be achieved by adding biodegradable promoters such as low Tg flexible PCL, PBSA, PHA and other PLA-biodegrading additives.

Heat Sealable Layer (C), a First Outer Layer

In an embodiment, suitable biopolymers to formulate the heat sealable layer together with amorphous PLA reins could be those certified home compostable biopolymeric resins having a melting temperature Tm in the range of $56° C. \leq Tm \leq 90° C.$ and a glass transition temperature Tg lower than 0° C. ($Tg \leq 0° C.$). Aside from low SIT, broader heat sealing window, and high plateau heat seal strength, the sealant layer is needed to have a function of preventing from blocking as well as a function of noise dampening. More preferably, the blend of components in the heat seal layer improves the seal initiation temperature by at least 20 to 25° F., preferably, 40° F. In the invention, the SIT is reduced from 193° F. (89° C., SIT of amorphous PLA sealant layer) to 152° F. (67° C.) using certified home compostable biodegradable polymers.

In an embodiment, one example of suitable resins to formulate the sealant layer (C) for improvement of heat seal initiation and plateau heat seal strength is polybutylene succinate co-adipate (PBSA) resin. PBSA is a random co-polyester synthetized by the reaction of 1,4-butanediol with aliphatic dicarboxylic acids such as succinic and adipic acids. Example of PBSA resins could be PTTMCC BioPBSA™ FD92PM, which is commercially available from Mitsui Plastics. FD92PM has 36 wt % renewable source content derived from renewable succinic acid. PBSA typically has a melting temperature point of about 87° C., a density of about 1.24 g/cm3, a glass transition temperature of about −47° C., a crystallinity of about 30%, a melt flow index of 4 g/10 min. at 190° C./2.16 Kg test condition. FD92PM has been certified for both industrial and home composting application.

In an embodiment, another suitable resin to improve further the heat sealing properties of amorphous PLA is polyε-caprolactone. PCL is a polyester produced by the ring-opening of ε-caprolactone in the presence of aluminum isopropoxide and is currently made from petroleum-based monomers. PCL has been certified for both industrial and home composting application by TUV Austria Group. Examples of PCL resins could be Ingevity CAPA® 6500D or CAPA® 6800D, which has a melting temperature of about 58° C., a glass transition temperature of about −60° C., a density of about 1.15 g/cm3, a crystallinity of about 48%, and a melt flow index of 18 g/10 min. and 2.4 g/10 min. for CAPA6800D respectively tested with 2.16 kg load and 1" PVC die at 160° C.

In an embodiment, another example of low Tg flexible biopolymer suitable to formulate the sealant layer of a biodegradable composite film is poly(butylene adipate-co-butylene-terephthalate) (PBAT) resins. One example of PBAT resins could be BASF ecoflex® C1200, which has a Tg of about −30° C. and low crystallinity of around 15%, giving a broad melting peat between 50° C. and 150° C. with a peak value at about 120° C. It is a very rubbery and soft biopolymer and can provide good effects on modulus reduction and sound dampening. PBAT is only certified for industrial composting application.

In an embodiment, PHA resins having a very slow crystallization rate unfortunately are often undesirable for use in heat sealant layer of a biodegradable composite film. Amorphous PHA resin is not suitable for use in the heat seal layer since it does not solidify at ambient or sealing temperatures due to its low glass transition temperature.

In an embodiment, a first heat sealable layer (C) (that is the first outer skin layer) comprises certified home compostable semi-crystalline polycaprolactone (PCL), polybutylene succinate-co-adipate (PBSA) and amorphous PLA resin. Suitable composition for improving the heat seal properties comprises 20 to 60 wt % amorphous polylactic acid resins; 20 to 70 wt % PBSA resins; 5 to 35 wt % PCL resins; and 0.05 to 3 wt % slip and antiblocking agents for slip and blocking control. Quantity of the modifying resin in the range have been found to sufficiently lower the seal initiation temperature yet maintain the processability during film-making as well as to help keep the sealant layer home compostable. Both PBSA and PCL can crystallize much faster than semi-crystalline PHA resins and have a sharp crystallization peak, indicating less defect in the crystals of PBSA and PCL, as they cool in sealing process compared to PHA resins. Quick solidifying and crystallization have a huge advantage to heat sealing performance and lowering heat sealing cycle time. Those two resins also have the advantage of being fully biodegradable and home compostable, they could also promote the home compostability of amorphous PLA resins in the heat seal layer. This is very important to maintain the overall biodegradability and/or compostability of the whole multi-layer coextruded film.

In an embodiment, this first heat sealable layer (C) can include an antiblock component selected spherical cross-linked silicone polymer such as Tospearl® grades of polymethlysilsesquioxane of nominal 2.0 and 3.0 µm sizes and sodium aluminum calcium silicates of nominal 3 µm or 5 µm in diameter (such as Mistui Silton® JC-30 and JC-50), but other suitable spherical inorganic antiblocks can also be used including polymethylmethacrylate, silicas, and silicates, and ranging in size from 2 µm to 6 µm. Migratory slip agents such as fatty amides or silicone oils can also be optionally added to the heat seal resin layer of types and quantities mentioned previously if lower COF is desired. However, if the films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain. Suitable amounts of slip additives to use can range from 300 ppm to 10,000 ppm of the layer. Preferably, the thickness of the heat sealable layer is in the range of 1 to 4 µm, more preferably, 2 to 3 µm.

Second Outer Skin Layer (A), a Third Layer

In an embodiment, a second outer skin layer (A) on the core layer (B) opposite the heat sealable layer (C) (with a coextruded laminate structure of A/B/C) could be included into the coextruded laminate film for use as a printing layer (i.e. printing ink receiving layer) or metal receiving layer or coating receiving layer.

This second outer skin layer (A) of this laminate could include biodegradable composite comprising the same compositions as the composite in the core layer or a different blend thereof. The second outer skin layer could comprise a majority of crystalline PLA, PBSA and PCL composition for improving heat resistance. This second outer skin layer (A) could also incorporate various additives such as antiblock particles for film-handling purposes. If desired, this third layer (A) could also include the same or similar composition as the inventive sealable layer (C), thus rendering the overall multi-layer film a two-side sealable film.

In the embodiment of a three-layer coextruded film structure (A/B/C), the second outer skin layer (A) can include similar amounts of antiblock and slip additives as the respective core and heat sealable layers, although the amounts are likely to be optimized for performance. In this embodiment, it is not necessary for the core layer (B) to include antiblock particles (although migratory additives may still be included in the core layer as a reservoir from which such additives may migrate to the outer surface layers as desired).

In an embodiment, in the case where the above embodiments are to be used as a substrate for vacuum deposition metallizing, it is recommended that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film could vaporize and cause pin-holing of the metal-deposited layer, thus compromising gas barrier properties. Thus, only non-migratory antiblock materials should be used to control COF and web-handling.

In an embodiment, in the case where the above embodiments are to be used as a printing film, it may be advisable to avoid the use of silicone oils, in particular low molecular weight oils, as these may interfere with the print quality of certain ink systems used in process printing applications. However, this depends greatly upon the ink system and printing process used.

In an embodiment, it is desirable to include antiblocks and/or migratory slip additives for the third skin layer (A) to control COF properties. Suitable examples of antiblocks include crosslinked silicone polymer (polymethylsilsesquioxane) such as Tospearl® grades 120 and 130 of about 2.0 and 3.0 µm sizes, and sodium aluminum calcium silicates of about 3 µm and 5 µm in diameter such as Mitsui Silton® JC-30 and JC-50. But other suitable spherical inorganic antiblocks can be used including polymethylmethacrylate, silicas, and silicates, and ranging in size from 2 to 3 µm. Optionally, an amount of migratory slip agents in the art could be included to lower COF if desired. However, if the films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain. Suitable amounts of slip additives to use can range from 300 ppm to 10,000 ppm of the layer. Preferably, the thickness of the second outer skin layer is in the range of 0.5 to 2 µm, more preferably, 1 to 1.5 µm.

In an embodiment, in the case of migratory additives is a problem that impacts the productivity and film quality such as particle and powder plate-out, the second outer skin layer (A) should not include those additives. In the case of the migratory additives are required to be incorporated into the core layer (B), the second outer skin layer (A) can function as a cap layer to eliminate additive migration from the core layer to the surface of the second outer skin layer (A).

In an embodiment, in the case of a 3-layer laminate structure, it is preferable to discharge-treat the side of the second outer skin layer (A) opposite the heat sealable first layer (C). This second outer skin layer, as mentioned earlier, is often formulated with materials that are conducive to receiving printing inks, metallizing, adhesives, or coatings. The skills of discharge-treatment in the above embodiments are well known in the art.

The embodiments of the coextruded laminate film could further include a primer layer on the discharge-treated layer's surface and a barrier coating layer over the primer layer by offline coating process. A vacuum-deposited metal layer could be coated on the barrier layer to further improve barrier properties. Preferably, the metal layer has a thickness of about 5 to 100 nm, has an optical density of about 1.5 to 3.0, and includes aluminum, although other metals can be contemplated such as titanium, vanadium, chromium, manganese, iron, cobalt, nickel, copper, zinc, gold, or palladium, or alloys or blends thereof.

Film Making

In an embodiment, the heat sealable resin layer (C) could be coextruded on one side of the core layer (B), the heat sealable layer has a thickness after biaxial orientation of between 0.5 and 5 µm, preferably between 2.0 and 3.0 µm. The core layer thickness can be of any desired thickness after biaxial orientation, but preferred and useful thicknesses are in the range of 10 to 100 µm, preferably 14 to 25 µm, and even more preferably 15 to 20 µm. The coextrusion process includes a multi-layered compositing die, such as a two- or three-layer die. In the case of a two-layer coextruded film, a two-layer compositing die can be used. In the case of a three-layer coextruded film, the core layer can be sandwiched between the heat sealable resin layer and a second outer skin layer using a three-layer compositing die.

In an embodiment, the laminate film is produced via coextrusion of the heat sealable layer and the core layer and other layers if desired, through a compositing die whereupon the molten multilayer film structure is quenched upon a chilled casting roll system or casting roll and water bath system and subsequently oriented in the machine direction (MD) and/or transverse direction (TD) into an oriented multi-layer film. Machine direction orientation (MDO) rate is typically 2.0-3.5 times and transverse direction orientation (TDO) is typically 3.0-5.0 times in a polyester film line. A relaxation rate of 5 to 15% after TDO can be applied to the oriented film in TD for reducing heat shrinkage. Heat setting conditions in the TDO oven is also critical to minimize thermal shrinkage effects. Those are well-known processes and skills in the art.

In an embodiment, in the current invention, examples were practiced on a film making line armed with a three-layer 12-inch-wide flat die for molding and capability of orientation in machine direction (MD) and then in transverse direction (TD). The main composition in the core layer is a PLA-rich biodegradable composite described earlier. The multi-layer laminate sheet was coextruded at extrusion temperatures designed for each layer, cast and pinned—using electrostatic pinning—onto a cooling drum whose surface temperature was controlled between 15° C. and 30° C. to solidify the non-oriented laminate sheet at a casting speed of about 7 to 11 mpm (meter per minute). The non-oriented laminate sheet was stretched first in the machine direction at about 50° C. to 65° C. at a stretching ratio of about 2 to about 3.5 times the original length, using differentially heated and sped rollers and the resulting stretched sheet is heat-set at about 40-50° C. on annealing rollers and cooled at about 30-40° C. on cooling rollers to obtain a uniaxially oriented laminate sheet. The uniaxially oriented laminate sheet is then introduced into a tenter oven at a line speed of about 25 to 38 mpm and preliminarily heated between 60° C. and 75° C., and stretched in the transverse direction at a temperature of about 75-95° C. at a stretching ratio of about 3 to 5 times the original width and then heat-set or annealed at about 90-140° C., and preferably 125-140° C., to reduce internal stresses due to the orientation and minimize shrinkage and give a relatively thermally stable biaxially oriented sheet. TD orientation rates were adjusted by moving the transverse direction rails in or out per specified increments based on the TD infeed rail width settings and width of the incoming machine-direction oriented film. The biaxially oriented film has a total thickness between 10 and 100 µm, preferably between 15 and 30 µm, and most preferably between 17.5 and 20 µm.

In an embodiment, after biaxial orientation, the film may optionally be passed through an on-line discharge-treatment system, such as corona, flame, plasma, or corona treatment in a controlled atmosphere as described previously to whatever desired surface energy. Typically, useful surface energy can be 36-50 dyne/cm. The film is then wound into a roll form through film winding equipment.

One embodiment is to offline coat a primer coating on the second outer layer (A) to improve the adhesion of barrier coating to the bulk film, and the surface smoothness. Suitable examples of primer coatings include polyurethane (PU) coating, polyacrylate coating, and polyethylenimine (PEI) coating. One embodiment is to coat a barrier coating on the top of primer layer. The barrier coating could be a water-borne barrier coating solution derivative from any polymers of PVOH, EVOH, PEI, PU, and mixture thereof.

In one embodiment, the coextruded laminate is a heat sealable film printable on the surface layer opposite the heat sealable layer.

In another embodiment, the coextruded laminate is two-side heat sealable.

In another embodiment, the coextruded film is a heat sealable film with a second outer layer to receive a primer, or coating or vacuum-deposited metal layer or the combination thereof. One embodiment is to directly metallize the discharge-treated surface opposite the heat sealable layer. One embodiment is to metallize the coated barrier layer surface opposite the heat sealable layer. One embodiment is to metallize the surface layer with barrier coating added onto the primer coating opposite the heat sealable layer.

In another embodiment, a protecting coating layer could be coated over the metal layer to prevent from potential metal cracking and further improve barrier properties.

In an embodiment, the unmetallized laminate sheet or coated primed sheet is first wound in a roll. The roll is placed in a vacuum metallizing chamber, preferably, the sheet is in-chamber pre-treated at a desirable energy level before the metal is vapor-deposited onto the discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 3.0. The metallized film is then tested for oxygen and moisture gas permeability, optical density, metal adhesion, metal appearance and gloss, heat seal performance, tensile properties, thermal dimensional stability, and can be made into a laminate structure.

This invention will be better understood with reference to the following examples, which are intended to illustrate specific embodiments within the overall scope of the invention.

EXAMPLE 1

A three-layer coextruded biaxially oriented PLA film was made as control using sequential orientation on a 12-inch-wide flat die line as described previously, including a core layer (B) formulation of about 85 wt % of the core layer of crystalline Luminy® LX575 with about 15 wt % of the core layer of amorphous Luminy® LX975. The non-sealable layer (A) included about 84.7 wt % crystalline LX575, 15 wt % Luminy® LX975, and 0.3 wt % PLA10A. which is an antiblock masterbatch comprising 5 wt % Silton® JC-30 particles and 95 wt % amorphous PLA carrier resin Luminy® LX975. The loading of JC-30 particles in the second outer skin layer (A) is 150 ppm. The coextruded heat sealable skin layer (C) is composed substantially of LX975 at about 94 wt % of the sealant layer, and 6 wt % PLA10A, such that the concentration of antiblock in the layer (C) is about 3000 ppm (0.3 wt %). Thus, the overall effective amount of amorphous PLA resin in the layer (C) was about 99.7 wt % due to the LX975 initially added plus the LX975 used as the carrier resin in the antiblock masterbatch.

The total thickness of this film substrate after biaxial orientation was about 80 gauges (G) or 0.8 mil or 20 μm. The thickness of the respective heat sealable resin layer (C) after biaxial orientation was about 8 G (2.0 μm). The thickness of the core layer (B) after biaxial orientation was about 68 G (17.0 μm). The thickness of the non-sealable skin layer (A) was about 4 G (1.0 μm).

The outer skin layers and the core layer were melt coextruded at 204° C. together through a twelve-inch flat die to be cast on a chill drum using an electrostatic pinner. The formed cast sheet was passed through a machine-direction orienter to stretch 2.8 times stretch ratio in the machine direction (MD). This was followed by transverse direction (TD) stretching at about 4.5 times stretch ratio in the tenter oven. The resultant biaxially oriented film was subsequently heat-set and discharge-treated on the surface of the second outer skin layer (A) opposite the heat sealable skin layer (C) via corona treatment. The film was then wound up in roll form.

EXAMPLE 2

Example 1 was repeated except that the core layer (B) formulation as well as the second outer skin layer (A) was changed to a PLA-rich biodegradable composite (PLA nanoalloy) modified with 20 wt % CAPA® 6500D and biodegradation promoters (the invention in detail was disclosed in the prior art WO2021185339A1). PLA nanoalloy developed from NANOALLOY™ TECHNOLOGY is a melt blended biodegradable composite comprising 38.3 wt % Luminy® LX575, 38.3 wt % Luminy® LX975, 20.0 wt % Ingevity CAPA® 6500D, 2.0 wt % Oleris® sebacic acid provided by Arkema, 1.2 wt % Joncryl ADR4468, and 0.2 wt % Zinc Stearate (Baerlocher™ RSN131HS). PCL is well dispersed into nano to semi-micron scale in PLA phase according to TEM images. The PLA10A in the second outer skin layer (A) was increased to 0.6 wt %. There was no change applied to the formulation of the heat sealable layer (C). The extrusion temperatures of all three layers were reduced from 203° C. to 193° C.

EXAMPLE 3

Example 2 was repeated with the same core layer recipe. However, the second outer layer (A) formulation was changed to about 94 wt % LX975 and 6 wt % PLA10A; the heat sealable layer (C) formulation was changed to 64 wt % LX975, 20 wt % FD92PM, 10 wt % CAPA® 6500D and 6 wt % PLA10A. The overall effective amount of amorphous PLA resin LX975 in the heat sealable layer was reduced from 99.7 to 69.7 wt %. The extrusion temperature of the heat sealable layer (C) was reduced from 193° C. to 171° C.

EXAMPLE 4

Example 2 was repeated except that the sealant layer (C) formulation was changed to about 54 wt % LX975, 30 wt % FD92PM, 10 wt % CAPA® 6500D and 6 wt % PLA10A. The extrusion temperature of the heat sealable layer (C) was reduced from 193° C. to 171° C.

EXAMPLE 5

Example 4 was repeated except that the sealant layer (C) formulation was changed to about 44 wt % LX975, 40 wt % FD92PM, 10 wt% CAPA® 6500D, and 6 wt % PLA10A. The overall effective amount of amorphous PLA resin LX975 was about 49.7 wt %.

EXAMPLE 6

Example 4 was repeated except that the sealant layer (C) formulation was changed to about 64 wt % LX975, 30 wt % CAPA® 6500D, and 6 wt % PLA10A. The overall effective amount of the amorphous PLA resin LX975 was about 69.7 wt %.

EXAMPLE 7

Example 5 was repeated except that the sealant layer (C) formulation was changed to about 24 wt % LX975, 50 wt % FD92PM, 20 wt % CAPA® 6500D, and 6 wt % PLA10A. The total content of certified home compostable biodegradable polymers with Tg≤0° C. was increased from 50 wt % to 70 wt %. The effective amount of amorphous PLA resin LX975 was reduced to about 29.7 wt %.

EXAMPLE 8

Example 7 was repeated except that the second outer skin layer (A) formulation was changed to about the same as that in the heat sealant layer (C). The effective amount of the amorphous PLA LX975 was about 29.7 wt %. The extrusion temperature of the second outer skin layer was changed from 190° C. to 171° C.

EXAMPLE 9

Example 2 was repeated except that the sealant layer (C) formulation was changed to 64 wt % PLA nanoalloy, 20 wt % FD92PM, 10 wt % CAPA® 6500D, and 6 wt % PLA10A. The overall effective amount of amorphous PLA resin LX975 was about 30.2 wt %; and the effective amount of crystalline PLA resin LX575 is about 24.5 wt %; and the effective amount of CAPA® 6500D is about 22.8%. The total content of processing aids such as chain extender is 2.2 wt %.

EXAMPLE 10

Example 2 was repeated except that the sealant layer (C) formulation was changed to about 100 wt % Ecovio® F2341, and the second outer skin layer (A) was also changed to Ecovio® F2341. F2341 is certified for home compostable application by TUV Austria Group.

RESULTS

Film Properties

The biaxially oriented biodegradable composite films were then tested for heat seal properties, optical properties, COF, and mechanical properties. The formulations of the heat sealable layer (C) of the coextruded films made in the Examples ("Ex.") are shown in Table 1.

TABLE 1

Formulations of the heat sealable layer (C) of the coextruded films made in the Examples ("Ex.")

Sealant layer (C) composition, wt %

| Example | LX975 | PLA10A | FD92PM | CAPA6500D | PLA Nanoalloy | F2341 |
|---|---|---|---|---|---|---|
| Ex. 1 | 94 | 6 | | | | |
| Ex. 2 | 94 | 6 | | | | |
| Ex. 3 | 64 | 6 | 20 | 10 | | |
| Ex. 4 | 54 | 6 | 30 | 10 | | |
| Ex. 5 | 44 | 6 | 40 | 10 | | |
| Ex. 6 | 64 | 6 | | 30 | | |
| Ex. 7 | 24 | 6 | 50 | 20 | | |
| Ex. 8 | 24 | 6 | 50 | 20 | | |
| Ex. 9 | 0 | 6 | 20 | 10 | 64 | |
| Ex. 10 | | | | | | 100 |

Figure 1:
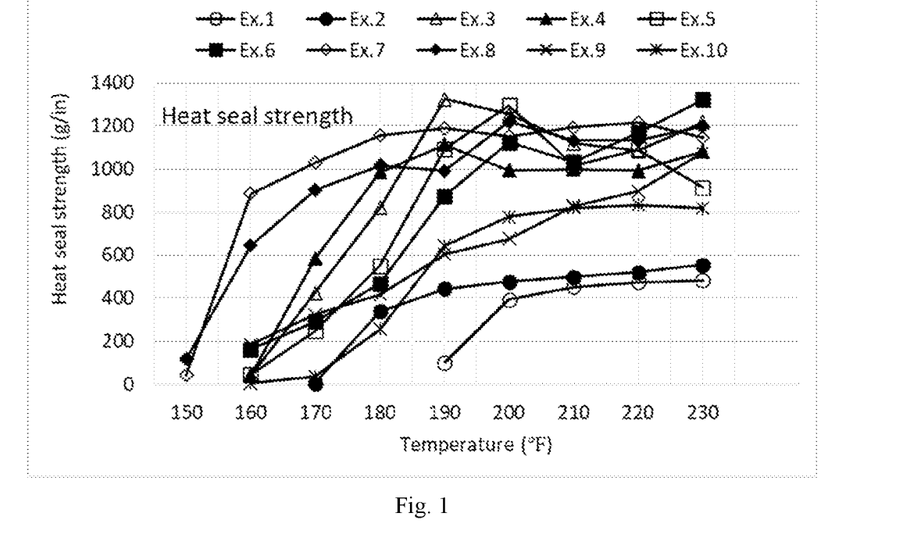
FIG. 1 shows the heat seal curves of the coextruded films.
Figure 2:
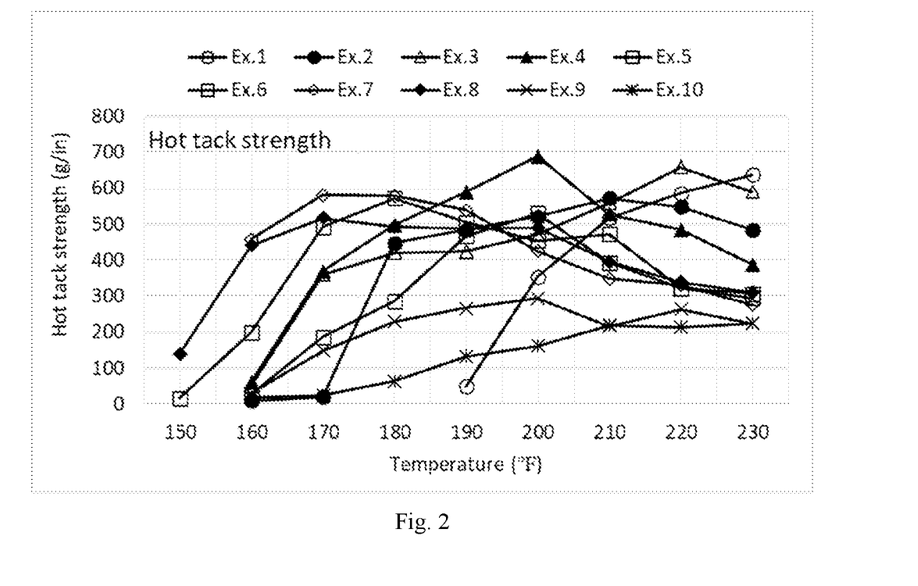
FIG. 2 shows the hot tack curves of the coextruded films.

The heat seal curves and hot tack curves of the coextruded films were shown in FIGS. 1 and 2, respectively. The heat seal properties including hot tack properties are shown in Table 2.

TABLE 2

Heat seal properties and hot tack properties of the coextruded films made in the Examples ("Ex.")

| | Heat seal properties | | | | Hot tack properties | | | |
|---|---|---|---|---|---|---|---|---|
| Example | SIT (° F.) | Sealing temp. window (° F.)* | Plateau seal strength (g/in) | Plateau temp. range (° F.)** | SIT (° F.) | Sealing temp. window (° F.)* | Plateau seal strength (g/in) | Plateau temp. range (° F.)** |
| Ex. 1 | 193 | 77 | 452 | 60 | 194 | 76 | 524 | 60 |
| Ex. 2 | 176 | 64 | 500 | 40 | 174 | 66 | 510 | 50 |
| Ex. 3 | 165 | 75 | 1138 | 40 | 165 | 75 | 498 | 60 |
| Ex. 4 | 163 | 77 | 1029 | 50 | 165 | 75 | 507 | 60 |
| Ex. 5 | 167 | 73 | 1131 | 50 | 160 | 80 | 446 | 70 |
| Ex. 6 | 162 | 78 | 1105 | 40 | 172 | 68 | 382 | 50 |
| Ex. 7 | 152 | 88 | 1122 | 70 | 160 | 80 | 443 | 70 |
| Ex. 8 | 152 | 88 | 1086 | 60 | 152 | 88 | 434 | 70 |
| Ex. 9 | 160 | 80 | 816 | 40 | 175 | 65 | 250 | 50 |
| Ex. 10 | 177 | 63 | 779 | 40 | 207 | 33 | 219 | 30 |

*Oriented PLA control film wrinkles at about 270° F., and home compostable composite film wrinkles at about 240° F., heat sealing temperature window (° F.) = maximum sealing temp. − SIT;
**Plateau temp. range (° F.) = Temp. range at which a flat plateau of heat seal strength is obtained.

The optical properties and coefficient of friction were shown in Table 3.

TABLE 3

Optical Properties and coefficient of friction of the coextruded films made in the Examples ("Ex.")

| | | Gloss | | COF, A/A | | COF, A/C | | COF, C/C | |
|---|---|---|---|---|---|---|---|---|---|
| Example | Haze (%) | A side/ 60° | B side/ 20° | µs | µd | µs | µd | µs | µd |
| Ex. 1 | 2 | 122 | 92 | 0.82 | 0.70 | 0.64 | 0.66 | 0.56 | 0.53 |
| Ex. 2 | 8 | 104 | 81 | 0.40 | 0.25 | 0.47 | 0.30 | 0.56 | 0.51 |
| Ex. 3 | 10 | 99 | 42 | 0.46 | 0.49 | 0.45 | 0.43 | 0.36 | 0.36 |
| Ex. 4 | 10 | 94 | 27 | 0.37 | 0.39 | 0.36 | 0.42 | 0.36 | 0.32 |
| Ex. 5 | 11 | 90 | 26 | 0.39 | 0.42 | 0.52 | 0.45 | 0.32 | 0.32 |
| Ex. 6 | 14 | 86 | 18 | 0.35 | 0.38 | 0.40 | 0.42 | 0.41 | 0.42 |
| Ex. 7 | 12 | 85 | 17 | 0.41 | 0.46 | 0.84 | 0.78 | 0.77 | 0.72 |
| Ex. 8 | 23 | 53 | 7 | 0.56 | 0.58 | 0.57 | 0.56 | 0.53 | 0.58 |
| Ex. 9 | 16 | 82 | 14 | 0.33 | 0.37 | 0.34 | 0.38 | 0.29 | 0.28 |
| Ex. 10 | 59 | 26 | 3 | 0.73 | 0.54 | 0.70 | 0.52 | 0.57 | 0.48 |

The mechanical properties of the coextruded film were shown in Table 4.

TABLE 4

Mechanical properties of the coextruded films made in the Examples ("Ex.")

| Examples | Tensile stress (MPa) | | Elongation at break (%) | | Modulus (MPa) | |
|---|---|---|---|---|---|---|
| | MD | TD | MD | TD | MD | TD |
| Ex. 1 | 121 | 182 | 133 | 64 | 3530 | 5813 |
| Ex. 2 | 92 | 154 | 183 | 91 | 3144 | 3993 |
| Ex. 3 | 76 | 98 | 153 | 110 | 2821 | 3387 |
| Ex. 4 | 92 | 108 | 180 | 113 | 2940 | 3112 |
| Ex. 5 | 94 | 92 | 167 | 106 | 2897 | 2787 |
| Ex. 6 | 89 | 97 | 177 | 130 | 2948 | 3240 |
| Ex. 7 | 92 | 87 | 153 | 101 | 2951 | 2476 |
| Ex. 8 | 81 | 99 | 163 | 110 | 2466 | 2750 |
| Ex. 9 | 93 | 111 | 147 | 133 | 3012 | 3286 |
| Ex. 10 | 82 | 79 | 173 | 123 | 2479 | 2255 |

Example 1 (Ex. 1), as Table 1 shows, is the first control film using a biaxially oriented PLA film with almost 100 wt % PLA resins in all three layers. The sealant layer (C) comprised 97.7 wt % amorphous PLA resin LX975, it showed the highest SIT at 193° F. (which is the temperature to obtain 200 g/in (grams per inch) seal strength) among the samples. The control film started wrinkling at 270° F., so the effective sealing temperature window is in the heat seal range of from 193° F. to 270° F., which is roughly about 77° F. in terms of how wide the sealing temperature range is. The plateau seal strength on average was acceptable at 452 g/in, the plateau temperature range is defined from the low temperature point to high point in the plateau, which is effective and stable sealing temperature window. The SIT of hot tack of the first control sample was also high at about 194° F. The temperature window and hot tack strength showed in hot tack testing was comparable to that of heat sealing test data.

Example 2 (Ex. 2) is a second control sample comprising a core layer of PLA-rich biodegradable composite resin PLA nanoalloy. The PLA nanoalloy comprised about 20 wt % polycaprolactone CAPA® 6500D, 38.9 wt % LX575, 38.9 wt % LX575, 2 wt % sebacic acid, 1.2 wt % Joncryl ADR 4468 and 0.2 wt % Zn St. PCL CAPA® 6500D is low-Tg (−60° C.) certified home compostable flexible biopolymer. Sebacic acid, ADR 4468, and Zn St are lubricants and processing aids. PCL is a flexible biodegradable polymer of improving biodegradation and reducing stiffness (modulus and noise) of an oriented film as discussed earlier. The sealant layer (C) achieved a SIT at 176° F. lower than that of the first control sample (Ex. 1) even if the sealant layer formulation between two film samples is unchanged. The film sample started wrinkling at about 240° F. during heat sealing test due to the low-Tg flexible PCL biodegradable polymer in the core layer, the heat resistance of the composite film is not as good as that of the first control film (BOPLA film). The plateau seal strength is comparable to that of the first control sample, however, the temperature span of both sealing temperature window and plateau temperature range are reduced to 64° F. and 40° F., respectively. The PCL resin in the core layer tended to give lower SIT results but not a broader heat seal range. Hot tack performance was similar to the heat sealing performance.

Examples 3, 4 and 5 (Ex. 3, Ex. 4 and Ex. 5) comprised about 6% wt % PLA10A, 10 wt % CAPA® 6500D, gradually reduced LX975 and increased FD92PM resins as shown in Table 1. Certified home compostable FD92PM was increased from 20 wt % to 40 wt %, in the meantime, LX975 was reduced 64 wt %, 54 wt % and 44 wt % to match the 100% loading in the formulation. The SITs of the film samples were reduced to 165, 163, 167° F., respectively. All three samples showed comparable sealing temperature window, plateau seal strength, and plateau temperature range as shown in FIG. 1 and Table 2. The plateau seal strength of the film samples was increased significantly up to a range around 1000 g/in to 1100 g/in. Sealing temperature range became much broader, which is the signal of hermetic seal behavior. The SIT and hot tack performance of the film samples in hot tack test were comparable to heat sealing performance except that the hot tack strength is around a range of from 450 to 500 g/in which is much lower than that of the heat seal strength of the samples due to its zero second delay time in pulling of hot tack test.

Example 6 was made to compare Example 3, 30 wt % CAPA® 6500 was used to substitute the combination of 20 wt % FD92PM and 10 wt % CAPA® 6500D in the sealant layer formation. The total content of certified home compostable biodegradable polymers with low Tg is unchanged. The heat sealing performance of the film sample was comparable to that of Example 3, however, the hot tack strength much lower to that of Example 3.

Examples 7 and 8 (Ex. 7 and Ex. 8) were made to increase both the loadings of FD92PM and CAPA® 6500D in Example 4 to 50 wt % and 20 wt %, respectively. Therefore, the total content of certified home compostable biodegradable polymers with Tg≤0° C. was raised to 70 wt % in the sealant layer formulation. The effective total content of amorphous PLA resin LX975 was reduced to 29.7 wt %. In Example 8, the second outer skin layer (A) has the same formulation as the heat sealable layer (C). This coextruded film is two side heat sealable. The SITs of the film samples were reduced to 152° F. which is the lowest among all film samples. The two film samples also showed the broadest sealing temperature window, their plateau seal strengths are comparable to that of Examples 4 to 6. However, the hot tack strength was gradually reduced at temperatures higher than 190° F., this observation is the same as the hot tack strength of the film samples of Examples 4 to 7 (as shown in FIG. 2) since the sealing temperatures are higher than that of the Tm of FD92PM and CAPA® 6500D resins, the zero second delay time before pulling in hot tack test results in lower hot tack strength in the range of higher sealing temperatures.

Examples 9 and 10 (Ex. 9 and Ex. 10) were made to include non-conventional heat seal resins for comparison. The sealant layer of the Ex. 9 comprised an amount of 24.5 wt % crystalline PLA resin LX575, which impacts the sealing performance of the sample in low temperature. Therefore, Ex. 9 has low SIT due to the contribution of FD92PM and CAPA® 6500D, while the sample did not show an obvious stable sealing plateau as shown in FIG. 1 although it showed high seal strength at temperatures higher than 200° F. In addition, Ex. 9 showed unacceptable poor hot tack performance. Both outer skin layers of Ex. 10 were Ecovio® F2341, which is certified for home compostable application. As shown in FIGS. 1 and 2, and Table 2, the sample showed good heat seal strength at temperatures higher than 190° F. while the sample also showed extremely poor hot tack performance as shown in FIG. 2. The materials in the sealant layer comprise crystalline PLA resins such as PLA4043D and PBAT resins such as Ecoflex® C1200 and inorganic filler CaCO3, those materials do not support a good hot tack performance.

Optical properties of the coextruded film samples are shown in Table 3. The first control sample (Ex. 1) showed the lowest haze at about 2%, and highest gloss for both A side (cast side or drum side) and B side (sealant side or air side). As the core layer and the second outer skin layer in Example 2 were changed to a PLA-rich biodegradable composite resin (Ex. 2), the haze was increased from to 8%, and the glosses for A side and B side were reduced to 104 and 81, respectively. The haze of the Example 3 was only increased slightly from that of Example 2 (8%) to 10% as the heat sealant layer was modified with 20 wt % FD92PM and 10 wt % CAPA® 6500D. The haze of Examples 3, 4, 5, 7 were maintained at the same level of 10 to 12 as the content of FD92PM was increased from 20 wt % to 50 wt % in the sealant layer, the low haze variation observed in those film samples suggests that the good combability was achieved among three polymers of amorphous PLA, PBSA and PCL having a similar refractive index. As PCL content was increased to 30% as shown in Ex. 6, the haze was increased to 14% from the haze (8%) of the second control sample (Ex. 2). The increase in haze is probably due to the formation of large PCL crystals in the sealant layer. The film sample in Ex. 8 is a two-side heat sealable film, both outer skin layers showed contribution to higher haze (23%). The outer skin layers of the film sample in Ex. 10 showed the highest haze (59%) and the lowest gloss for both sides due to the high loading CaCO3 in Ecovio® F2341 resin. The glosses of the outer skin layers are related to surface roughness, all composite film samples in the invention showed much lower glosses due to their higher surface roughness resulted from modification of a few different biopolymers with varied Tg and Tm even if they have shown good compatibility.

The COFs of the cast side (A side) and sealant side (C side) of the coextruded film samples were shown in Table 3. The "COF, A/A" is the COF of the cast side to cast side (A to A); the "COF, A/C" is the COF of cast side to sealant side (A to C); the "COF, C/C" is the COF of sealant side to sealant side (C to C). The cast side of the film sample in Example 1 showed the highest COF due to its low content in antiblock (JC-30 particle loading is only 150 ppm). The sealant layer of Example 7 showed COF slightly higher than that of other coextruded film samples is because the total content of low Tg flexible biodegradable polymers in the sealant layer is higher than that of other film samples. All film samples showed acceptable COF for down stream processing. To future reduce the COF of the film samples, one of the methods is to increase the loading of antiblocks or increase the size of the antiblocks or include slip additives such as erucamide additive into the sealant layer (C) or the second outer skin layer (A).

The mechanical properties of the coextruded film samples were showed in Table 4. As expected, the first control sample (Ex. 1) showed the highest tensile stress and modulus in both MD and TD, while the elongation at break (strain) of the sample is the lowest in both MD and TD among all film samples. The second control sample (Ex. 2) showed lower tensile stress and lower modulus but higher elongation at break, compared to that of the first control sample, which is because the contribution of low Tg flexible biodegradable polymer added into the biodegradable composite. A lower modulus suggests a lower film noise. 20 wt % PCL resin added into the composite not only reduced the SIT of the film sample but also increase the film flexibility, reduce the film modulus or film noise. The reduction in modulus from Ex. 1 to Ex. 2 is about 11% in MD and 31% in TD.

As low Tg flexible polymers were incorporated into the heat seal layer (C) as shown in Examples 4, 5, 6 and 7, the inventive film showed tensile strength in MD and TD direction only slightly lower than that of the control sample Ex. 2, however, the MD modulus in MD was reduced about 6% on average and 27% on average in TD, compared to the moduli of Example 2. Ex. 10 showed the lowest modulus in TD due to its high content of rubbery Ecoflex® C1200 in the outer skin layers. The bulk mechanical strength of the inventive film was maintained at acceptable level, and film modulus was reduced significantly through the modifier heat sealant layer, leading to a reduction in noise level of the film.

In conclusion, using certified home compostable low Tg flexible resins PBSA and PCL together with amorphous PLA resin in the sealant layer can significantly lower the seal initiation properties, enhance the plateau seal strength, and broaden the heat seal range without affecting overall heat seal strength performance. Hot tack properties are maintained in the levels of above 300 g/in (good to acceptable range, far above the bottom line 200 g/in for hot tack strength).

Test Methods

The various properties in the above examples were measured by the following methods:

Transparency of the film was measured by measuring the haze of a single sheet of film using a haze meter model like a BYK Gardner "Haze-Gard Plus®" substantially in accordance with ASTM D1003.

Gloss of the film was measured by measuring the desired side of a single sheet of a film by a surface reflectivity gloss meter (BYK Gardner Micro-Gloss) substantially in accordance with ASTM D2457. The A-side or non-sealable layer side was measured at a 60° angle; the sealant layer side was measured at a 20° angle.

Heat seal strength was measured using a LAKO™ Heat Sealer (model SL10) at 30 PSI, 0.5 second dwell time, and 15 second delay time before automatically testing the seal strength. The automated LAKO™ Heat Sealer is capable of forming a film seal, determining the seal strength, and generating a seal profile from a test film sample.

Hot tack strength was measured by using a LAKO™ Tool hot tack/sealer model SL10 at 30 PSI, 0.5 second dwell time, with heated flat Teflon coated lower seal jaw, and unheated upper seal jaw and with a delay time set to 0 seconds for hot tack testing.

Heat seal and hot tack seal initiation temperature (SIT): Measured by using the above methods (A) and (B) using the LAKO Heat Sealer or LAKO™ Tool SL10 hot tack sealer. Heat seal initiation temperature is the lowest temperature at which minimum 200 g/in seal strength is achieved. Hot tack initiation temperature is the lowest temperature at which minimum 200 g/in hot tack is achieved. Initiation temperatures of less than 200° F. (93° C.) are preferred.

COF of the outer skin layers of the coextruded biodegradable composite films made in Examples was tested under ambient temperature condition to determine the static and dynamic COF ($\mu s$ and $\mu d$) using the method of ASTM D1894.

Mechanical properties of the coextruded biodegradable composite films were tested under ambient temperature condition using the method of ASTM D882.

Home compostability of the coextruded biodegradable composite film is being evaluated in the home compost under the conditions specified in ASTMD5338-15 except the composting temperatures are controlled in the range 28±5° C. (AS 5810-2010 or "OK COMPOST HOME—CERTIFICATION, 2019 VERSION").

This application discloses several numerical ranges in the text, tables and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown in the description, but is to be accorded the widest scope consistent with the principles and features disclosed herein. Finally, the entire disclosure of the patents and publications referred in this application are hereby incorporated herein by reference.

All references, including granted patents and patent application publications, referred herein are incorporated herein by reference in their entirety.

What is claimed is:

1. A film comprising a polylactic acid (PLA)-rich core layer and a heat sealant layer;
wherein the core layer comprises a PLA resin and a non-PLA modifier X, wherein the core layer has an amount of the PLA resin more than 60 wt. % of a total weight of the core layer, wherein the PLA resin comprises an amount of a semi-crystalline PLA higher than 35 wt. % of a total weight of the core layer;
wherein the heat sealant layer comprises an amorphous PLA and a modifier Y, wherein the modifier Y has a glass transition temperature of $Tg \leq 0°$ C. and a peak melting temperature of $56°$ C.$\leq Tm \leq 90°$ C.;
wherein the heat sealant layer has an amount of 5 wt. % to 25 wt. % of a total weight of the film;
wherein the modifier X is a single material or a mixture of multiple materials;
wherein the modifier Y comprises a blend of polybutylene succinate-co-adipate (PBSA) and polycaprolactone (PCL), present in an amount 50 wt. % to 80 wt. % of weight of the heat sealant layer;
wherein the film is a biaxially oriented compostable composite film having a seal initiation temperature less than $176°$ F., a plateau seal strength higher than 800 g/in, a heat sealing temperature window of from 152 to 240°F, and a gloss measured from the heat sealant layer at $20°$ angle in accordance with ASTM D2457 is less than 80; and
wherein the heat sealant layer has a thickness of about 1 μm to about 5 μm.

2. The film of claim 1, wherein the heat sealant layer comprises the amorphous PLA in an amount of at least 20 wt. % of the total weight of the heat sealant layer.

3. The film of claim 1, wherein the modifier X has a glass transition temperature of $Tg \leq 10°$ C. and a melting temperature of $56°$ C.$\leq Tm \leq 180°$ C.

4. The film of claim 1, wherein an amount of the modifier X is less than 40 wt. % of a total weight of the core layer.

5. The film of claim 1, wherein the modifier X comprises polybutylene succinate (PBS), Polybutylene succinate (PBSA), Poly(caprolactone) (PCL), Poly(3-hydroxybutyrate-co-3-hydroxyvalerate) (PHBV) or mixture thereof.

6. The film of claim 1, wherein the modifier X further comprises a polyhydroxyalkanoates (PHA) resin, a Polybutylene adipate terephthalate (PBAT) resin or mixture thereof.

7. The film of claim 1, wherein the modifier X further comprises an amorphous polymer having a glass transition temperature of $Tg \leq 10°$ C.

8. The film of claim 1, wherein the modifier X further comprises a processing aid, a chain extender, a nucleating agent, a biodegradable promoter, a plasticizer, or a filler or mixture thereof.

9. The film of claim 8, wherein the biodegradable promoter comprises an enzyme or hydrolytic promoter and wherein the filler comprises inorganic particles and/or a slip additive.

10. The film of claim 8, wherein the inorganic particles comprise $CaCO_3$ or $TiO_2$ or mixture thereof.

11. The film of claim 1, wherein the film has a haze in the range of 8 to 14%.

12. The film of claim 1, wherein the film has a modulus of 2400 to 3000 MPa in machine direction and a modulus of 2400 to 3400 MPa in transverse direction.

13. The film of claim 1, wherein the film further comprises a skin layer having the core layer at one side and opposite to the heat sealant layer; wherein the skin layer is either a printing ink receiving layer, a metal receiving layer or a coating receiving layer.

14. The film of claim 13, wherein the skin layer has a thickness of about 1 μm to about 3 μm.

15. The film of claim 1, wherein the heat sealant layer comprises an amount of antiblock particles with a spherical size of 2 μm to 6 μm.

16. The film of claim 1, wherein the heat sealant layer comprises a migratory slip additive.

17. The film of claim 16, wherein a loading of the migratory slip additive is in the range of 500 to 5000 ppm of a total weight of the heat sealant layer.

18. The film of claim 1, wherein a thickness of the film is about 10 μm to about 50 μm.

19. A film comprising a polylactic acid (PLA)-rich core layer and a heat sealant layer;
wherein the core layer comprises a PLA resin and a non-PLA modifier X, wherein the core layer has an amount of the PLA resin more than 60 wt. % of a total weight of the core layer, wherein the PLA resin comprises an amount of a semi-crystalline PLA higher than 35 wt. % of a total weight of the core layer;
wherein the heat sealant layer comprises an amorphous PLA and a modifier Y, wherein the modifier Y has a glass transition temperature of $Tg \leq 0°$ C. and a peak melting temperature of $56°$ C.$\leq Tm \leq 90°$ C.;
wherein the modifier Y comprises a mixture of polybutylene succinate-co-adipate (PBSA) and polycaprolactone (PCL), wherein the PBSA is in an amount 20 wt. % to 70 wt. % and PCL is 5 wt. % to 35 wt. % of a total weight of the heat sealant layer;
wherein the film is a biaxially oriented compostable composite film having a seal initiation temperature less than $176°$ F., a plateau seal strength higher than 800 g/in, a heat sealing temperature window of from 152 to 240°F, and a gloss measured from the heat sealant layer at $20°$ angle in accordance with ASTM D2457 is less than 80.

* * * * *